United States Patent
Wang et al.

(10) Patent No.: US 6,541,600 B1
(45) Date of Patent: *Apr. 1, 2003

(54) WATER SOLUBLE AND DISPERSIBLE HIGHLY BRANCHED POLYAMIDES

(75) Inventors: Jin-Shan Wang, Pittford, NY (US); Huijuan D. Chen, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,390

(22) Filed: Jul. 31, 2001

(51) Int. Cl.$^7$ .................. C08G 69/62; C08G 63/44; C08G 73/00; C08L 77/06
(52) U.S. Cl. .................. 528/310; 528/312; 528/313; 528/315; 528/332; 528/335; 528/336; 528/337; 528/363; 528/422; 528/271; 528/272; 528/285; 528/286; 528/288
(58) Field of Search .................. 528/241, 272, 528/285, 286, 310, 288, 312, 313, 315, 332, 335, 336, 337, 363, 422

(56) References Cited

U.S. PATENT DOCUMENTS

| | | |
|---|---|---|
| 3,669,939 A | 6/1972 | Baker et al. |
| 4,857,630 A | 8/1989 | Kim |
| 5,041,516 A | 8/1991 | Frechet et al. |
| 5,196,502 A | 3/1993 | Turner et al. |
| 5,225,522 A | 7/1993 | Turner et al. |
| 5,227,462 A | 7/1993 | Turner et al. |
| 5,418,301 A | 5/1995 | Hult et al. |
| 5,514,764 A | 5/1996 | Frechet et al. |
| 5,567,795 A | 10/1996 | Vicari et al. |
| 5,663,247 A | 9/1997 | Sorensen et al. |
| 5,663,260 A | 9/1997 | Frechet et al. |
| 6,252,025 B1 | 6/2001 | Wang et al. |
| 6,300,424 B1 * | 10/2001 | Frechet et al. ............. 525/444 |
| 6,444,758 B2 * | 9/2002 | McNamara et al. ........ 525/302 |

OTHER PUBLICATIONS

Atsushi Kameyama et al; "Synthesis Of Reactive Polyesters By A Regioselective Addition Reaction Of Diepoxides With Diacyl Chlorides And Their Chemical Modification"; Macromolecules; 1992; vol. 25; pp. 2307–2311.

Paul J. Flory; "Molecular Size Distribution In Three Dimensional Polymers. VI. Branched Polymers Containing A–R–B$_{f-1}$ Type Units"; J. Amer. Chem. Soc.; 1952; vol. 74; pp. 2718–2723.

Todd Emrick et al; "An A$_2$ +B$_3$ Approach To Hyperbranched Aliphatic Polyethers Containing Chain End Epoxy Substitutes"; Macromolecules; 1999; vol. 32; pp. 6380–6382.

Mitsutoshi Jikei et al; "Communications To The Editor— Synthesis Of Hyperbranched Aromatic Polyamide From Aromatic Diamines And Trimesic Acid"; Macromolecules; 1999; vol. 32; pp. 2061–2064.

Young H. Kim; "Lyotropic Liquid Crystalline Hyperbranched Aromatic Polyamides"; J. Amer. Chem. Soc.; 1992; vol. 114; pp. 4947–4948.

C.J. Hawker et al; "One–Step Synthesis Of Hyperbranced Dendritic Polyesters"; J. Amer. Chem. Soc.; 1991; vol. 113; pp. 4583–4588.

Jin–Shan Wang et al; US Ser. No. 09/919,097; filed Jul. 31, 2001; "Process For Manufacture Of Soluble Highly Branched Polyamides, And At Least Partially Aliphatic Highly Branched Polyamides Obtained Therefrom".

* cited by examiner

Primary Examiner—P. Hampton-Hightower
(74) Attorney, Agent, or Firm—Andrew J. Anderson

(57) ABSTRACT

Highly branched polyamides prepared in a single step procedure of condensation polymerization of multifunctional monomer reactants comprising amine and carboxylic acid functional groups. Polymerization proceeds by reaction of an amine group of a first monomer unit with an acid group of a second monomer unit to form a reaction product having an amide linkage between the first and second monomer units and repetition of such amidation reaction between additional amine groups and acid groups of the multifunctional monomers and reaction products of the multifunctional monomers. In the present invention, in order to obtain a water soluble or dispersible hyperbranched polyamide, at least one of the multifunctional monomer unit reactants contains an amine, phosphine, arsenine or sulfide group, such that the highly branched polyamide contains in the backbone thereof an N, P, As or S atom capable of forming an onium ion.

24 Claims, No Drawings

WATER SOLUBLE AND DISPERSIBLE HIGHLY BRANCHED POLYAMIDES

FIELD OF THE INVENTION

The present invention relates to novel highly branched polymers. Specifically, the present invention relates to water soluble and water dispersible highly branched polyamides.

BACKGROUND OF THE INVENTION

Polyamides represent one of the most important groups of polymers with excellent heat and flame resistance and high tensile strength and modulus. Branched polymers and copolymers have attracted considerable attention over the past decades, since many advanced materials with new or improved properties can be obtained therefrom. The terms "hyperbranched" and "highly branched" used herein with respect to branched polymers are intended to designate polymers having a relatively high percentage of propagated branching sites per number of polymerized monomer units, e.g. at least one branching site per every ten monomer units, preferably at least one branching site per every five monomer units and more preferably at least one branching site per every three monomer units. Highly branched polymers can be made by multi-step or one step processes. Multi-step generation processes were exemplified by Frechet in U.S. Pat. No. 5,041,516 and by Hult in U.S. Pat. No. 5,418,301. Both patents described that the highly branched polymers known as dendrimer or "starburst polymer" were made through a series of growth steps consisting of repeatedly reacting, isolating, and purifying.

One-step process was first conceptualized by Flory (J. Am. Chem. Soc., 74, p2718 (1952)) who demonstrated by theoretical analysis that a highly branched and soluble polymers could be formed from monomers comprising the structure $AB_2$, where A and B are reactive groups, by one-step condensation polymerization. In contrast to the dendrimers, the polymer formed by $AB_2$ polymerization is randomly branched. Most $AB_2$ type monomers, however, are not commercially available, and access to such monomers accordingly involves synthetic efforts, which is potentially problematic, especially on a large scale. To cope with such problem, one-step process for formation of a highly branched polymer may also use an $A_2+B_3$ approach. In $A_2+B_3$ polymerization, di- and tri-functional monomers are reacted together. For ideal $A_2+B_3$ polymerization, intramolecular cyclization must be minimized as a competing and chain terminating process during polymer propagation, all A groups and all B groups should have near equal reactivity in both the monomers as well as the growing polymers, and the A and B groups should have exclusive reactivity with each other. In view of such requirements, relatively few specific combinations of $A_2+B_3$ polymerization schemes have been proposed.

With regard to the synthesis of hyperbranched polyamides from $AB_2$-type monomers, Kim reported the synthesis of hyperbranched aromatic polyamides from sulfinyl amino acid chloride derivatives in organic solvents (J. Am. Chem. Soc., 114, 4947 (1992)). U.S. Pat. No. 5,514,764 disclosed preparation of hyperbranched aromatic polyesters and polyamides by a one-step process of polymerizing a monomer of the formula A—R—$B_2$ where R represents an aromatic moiety. U.S. Pat. No. 5,567,795 disclosed synthesis of highly branched polymers in a single processing step by using branching aromatic monomers and an end-capping monomer. With regard to $A_2+B_3$ polymerization, Jikei et al (Macromolecules, 32, 2061 (1999)), e.g., has reported synthesis of hyperbranched aromatic polyamides from aromatic diamines and trimesic acid.

However, most polyamides are generally characterized by poor solubility and processability. Although aromatic polyamides with hyperbranched architecture as disclosed in Kim (J. Am. Chem. Soc., 114, 4947 (1992)) and Jikei et al (Macromolecules, 32, 2061 (1999)) cited above were found to have better solubility in several organic solvents, no prior art discloses water-soluble or water dispersible hyperbranched polyamides. Furthermore, no prior art discloses water-soluble or water dispersible hyperbranched polyamide with organic colorant being part of repeating monomeric units in polymer backbone.

It would be desirable to provide water soluble and water dispersible hyperbranched polyamides. It would be further desirable to provide such water soluble and water dispersible hyperbranched polyamides which comprise an organic colorant moiety incorporated into the polymer backbone.

SUMMARY OF THE INVENTION

In accordance with one embodiment of the invention, novel highly branched polyamide polymers are disclosed, which comprise polyamides prepared in a single step procedure of condensation polymerization of ($a_1$) multi-functional di- or higher amine functional group containing monomers represented by the following formula (I) and multi-functional di- or higher carboxylic acid functional group containing monomers represented by the following formula (II), or a preformed salt of such di- or higher functional monomers, or ($a_2$) multi-functional branching monomers of the formula (III):

  (I)

  (II)

  (III)

where in formulas (I) and (II), $R^1$ and $R^2$ are each independently a monomeric, oligomeric, or polymeric compound nucleus, x and y are integers of at least 2, preferably from 2 and 4, without x and y being 2 at the same time, and in formula (III), one of A and B represents an amine functional group, the other of A and B represents a carboxylic acid functional group, L represents a monomeric, oligomeric, or polymeric compound nucleus linking group between A and B, n is at least 1 and m at least 2, and preferably n is 1 and m is 2 or 3;

wherein multiple monomer units of the highly branched polyamide are derived from monomers which contain an amine, phosphine, arsenine or sulfide group, such that the highly branched polyamide contains in the backbone thereof an N, P, As or S atom capable of forming an onium ion.

In a preferred embodiment of the invention, multiple monomer units of the highly branched polyamide are derived from monomers which contain a tertiary amine, phosphine, or arsenine group, such that the highly branched polyamide contains in the backbone thereof a quaternizable N, P or As atom, and most preferably a quaternizable N atom. In a particularly preferred embodiment, multiple monomer units of the highly branched polyamide are derived from tri-functional monomers of formula (I), (II) or (III) where $R^1$, $R^2$, or L is of the formula $Q[(CH_2)_p]_3$ wherein p represents an integer of from 1 to 6, preferably 1 to 3, and more preferably 2, and Q represents a quaternizable N, P or As atom, preferably a quaternizable N, or P atom, and most preferably a quaternizable N atom.

The present invention advantageously provides at least partially aliphatic hyperbranched polyamides which contain an onium ion forming moiety in the hyperbranched polymeric backbone, which polymers are water soluble or dispersible. The residual terminal groups of the hyperbranched polyamides may be functionalized and chemically capped, and a dye chromophore may also be incorporated into the hyperbranched polymeric backbone.

DETAILED DESCRIPTION OF THE INVENTION

The present invention is directed to novel highly branched polyamides prepared in a single step procedure of condensation polymerization of multifunctional monomer reactants comprising amine and carboxylic acid functional groups. Polymerization proceeds by reaction of an amine group of a first monomer unit with an acid group of a second monomer unit to form a reaction product having an amide linkage between the first and second monomer units and repetition of such amidation reaction between additional amine groups and acid groups of the multi-functional monomers and reaction products of the multi-functional monomers. In the present invention, in order to obtain a water soluble or dispersible hyperbranched polyamide, at least one of the multifunctional monomer unit reactants contains an amine, phosphine, arsenine or sulfide group, such that the highly branched polyamide contains in the backbone thereof N, P, As or S atoms capable of forming onium ions. Preferably, at least 5 percent (more preferably at least 10 percent, and most preferably at least 20 percent) of the monomer units of the highly branched polyamides are derived from such monomers which include an N, P, As or S atom capable of forming onium ions to facilitate water solubility or dispersibility of the polymer. Remaining monomer units may be derived from other multifunctional monomers.

In accordance with one embodiment of the invention, monomer units of a highly branched polyamide are derived from multifunctional monomer reactants which comprise a combination of multi-functional di- or higher amine functional group containing monomers represented by the following formula (I) and multi-functional di- or higher carboxylic acid functional group containing monomers represented by the following formula (II):

$$R^1(NH_2)_x \qquad (I)$$

$$R^2(COOH)_y \qquad (II)$$

where $R^1$ and $R^2$ are each independently a monomeric, oligomeric, or polymeric compound nucleus, and x and y are integers of at least 2, preferably from 2 and 4, without x and y being 2 at the same time, wherein multiple monomer units of the highly branched polyamide are derived from monomers which contain an amine, phosphine, arsenine or sulfide group, such that the highly branched polyamide contains in the backbone thereof an N, P, As or S atom capable of forming an onium ion. Preferably, multiple monomer units of the highly branched polyamide in accordance with such embodiment are derived from tri-functional monomers of formula (I) or (II) (i.e., where x or y is 3) where $R^1$ or $R^2$ is of the formula $Q[(CH_2)_p]_3$ wherein p represents an integer of from 1 to 6, preferably 1 to 3, and more preferably 2, and Q represents a quaternizable N, P or As atom, preferably a quaternizable N, or P atom, and most preferably a quaternizable N atom. Additional co-monomer units of the highly branched polyamide may be derived from multifunctional monomers of formula (I) and (II) wherein $R^1$ and $R^2$ compound nuclei may otherwise comprise, e.g., a further substituted or unsubstituted straight or branched alkyl, cycloalkyl, aryl or alkylaryl linking group moiety, or an oligomeric or polymeric chain moiety, to which the functional groups are attached. In a preferred embodiment, one of the multifunctional amines and multifunctional acids is di-functional (i.e., one of x and y is 2 in Formula I and II), and the other is tri-functional (i.e., the other of x and y is 3 in Formula I and II).

In accordance with a further embodiment of the invention, monomer units of a highly branched polyamide may be derived from multi-functional branching monomers of the formula (III):

$$A_n\text{---}L\text{---}B_m \qquad (II)$$

where one of A and B represents an amine functional group, the other of A and B represents a carboxylic acid functional group, L represents a monomeric, oligomeric, or polymeric compound nucleus linking group between A and B, and n is at least 1 and m at least 2, and preferably n is 1 and m is 2 or 3, wherein multiple monomer units of the highly branched polyamide are derived from monomers which contain an amine, phosphine, arsenine or sulfide group, such that the highly branched polyamide contains in the backbone thereof an N, P, As or S atom capable of forming an onium ion. Preferably, multiple monomer units of the highly branched polyamide in accordance with such embodiment are derived from tri-functional monomers of formula (III) (i.e., where n is 1 and m is 2) where L is of the formula $Q[(CH_2)_p]_3$ wherein p represents an integer of from 1 to 6, preferably 1 to 3, and more preferably 2, and Q represents a quaternizable N, P or As atom, preferably a quaternizable N, or P atom, and most preferably a quaternizable N atom. Additional co-monomer units of the highly branched polyamide may be derived from multifunctional monomers of formula (III) wherein L otherwise may be any monomeric, oligomeric, or polymeric compound nucleus, such as a further substituted or unsubstituted straight or branched alkyl, cycloalkyl, aryl or alkylaryl linking group moiety, or an oligomeric or polymeric chain moiety, and n preferably represents 1 and m preferably represents 2 or 3, and most preferably 2. Multifunctional $A_n$---L---$B_m$ branching monomers may themselves be commercially available, or may be prepared from commercially available starting materials using conventional reaction procedures. Multifunctional branching monomers may be pre-formed and isolated prior to subsequent reaction, or may be prepared in-situ in the formation of a highly branched polyamides in accordance with the invention.

In accordance with preferred embodiments of the invention, multiple (i.e., at least 2) monomer units of the described highly branched polyamides are derived from tri-functional monomers of formula (I), (II) or (III) wherein x or y is 3 or n is 1 and m is 2, and $R^1$, $R^2$ or L is of the formula $Q[(CH_2)_p$---$]_3$ wherein p represents an integer of from 1 to 6 and Q represents a quaternizable N, P or As atom. Most preferred is where $R^1$, $R^2$ or L is of the formula $N[(CH_2)_p$---$]_3$, e.g., where formula (I) monomer is tris(2-aminoethyl)amine or tris(2-aminopropyl)amine, formula (II) monomer is nitrilotriacetic acid, or formula (III) monomer is

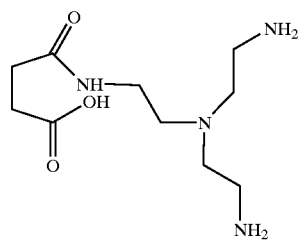

or

-continued

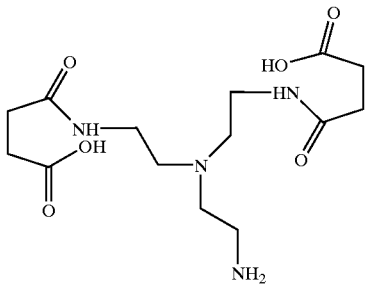

In a particular embodiment of the invention, $R^1$, $R^2$ and L can also be any dye chromophore to which functional amine or carboxylic groups may be attached or are otherwise present, such as a mono- or polyazo dye, such as a pyrazoleazoindole dye as disclosed in U.S. patent application Ser. No. 09/689,184 filed Oct. 12, 2000; an IR dye, a basic dye, a phthalocyanine dye, a methine or polymethine dye, a merocyanine dye, an azamethine dye, a quinophthalone dye, a thiazine dye, an oxazine dye, an anthraquinone, or a metal-complex dye, such as a transition metal complex of an 8-heterocyclylazo-5-hydroxyquinoline as described in U.S. Pat. Nos. 5,997,622 and 6,001,161.

Representative examples of $R^1$ and $R^2$ moieties for monomer units derived from di-functional monomer reactants include:

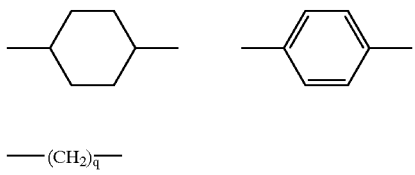

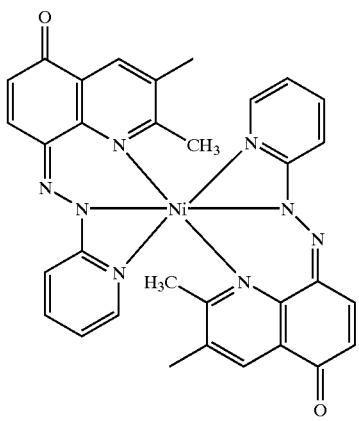

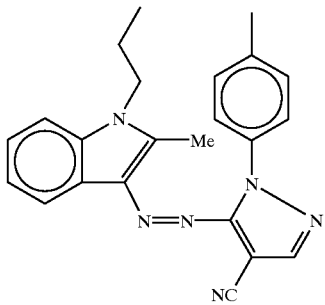

wherein q is an integer of from 2 to 21.

In another specific embodiment, $R^1$ and $R^2$ may be polymeric or oligomeric chains with the following monomer repeating units:

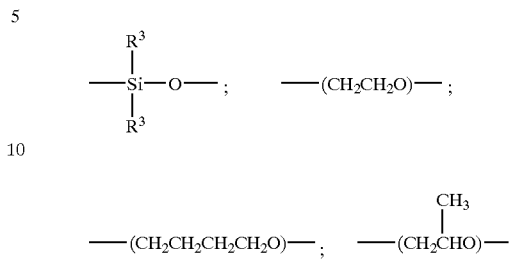

wherein $R^3$ is aryl and straight or branched $C_1$–$C_{20}$ alkyl.

Examples of multifunctional amines which may be used in the present process include but are not limited to: tris(2-aminoethyl)amine, tris(2-aminopropyl)amine, diaminohexane, ethylenediamine, diethylenetriamine, p-pheneylene diamine, 4,4'-oxydianiline, and Jeffamines.

Examples of multifunctional acids which may be used in the present process include but are not limited to: succinic acid, adipic acid, 1,4-cyclohexyl dicarboxylic acid, tall oil fatty acids, sebacic acid, dodecanedioic acid, dimer acids, C-19 dicarboxylic acid, C-21 dicarboxylic acid, nitrilotriacetic acid, trimesic acid, phthalic acid, isophthalic acid, terephthalic acid, (cis-/trans-)1,2-cyclohexanedicarboxylic acid, 1,2,4,5-benzenetetracarboxylic acid, 1,2,3,4-cyclopentane-tetra-carboxylic acid. Multifunctional acids may be added in anhydride form and hydrolyzed to the corresponding acid form, or directly reacted in anhydride form. Depending the experimental conditions, polymerization of monomer I and anhydride may proceed via an $A_x+B_y$ or an $A_n$—L—$B_m$ reaction scheme.

Examples of multifunctional branching co-monomers of formula (III) which may be used in accordance with the invention in combination with branching monomers which include an onium ion forming atom include but are not limited to: 2,3-diaminoproponic acid, 2,5-diaminopentanoic acid, 1-Lysine hydrate.

Highly branched polyamides which incorporate an onium ion forming atom in monomer units in the polymeric backbone in accordance with the present invention may be obtained by polymerization processes which may be conducted in any solvents, which might include but are not limited to ethers, cyclic ethers, alkanes, cycloalkanes which may be substituted, aromatic solvents, halogenated hydrocarbon solvents, acetonitrile, dimethylformamide, ethylene carbonate, dimethylsulfoxide, dimethylsulfone, alcohol, water, mixture of such solvents, and supercritical solvents such as carbon dioxide, alkanes in which any H may be replaced with F, etc. The polyamides may be obtained by polymerization processes conducted in accordance with known suspension, emulsion, microemulsion, gas phase, dispersion, precipitation, template, reactive injection molding, phase transfer polymerization processes, melting polymerization, and the like. The polymerization can be conducted in accordance with known batch, semi-batch, continuing processes, tube-flow, and the like. The polymerization temperature can generally be varied from −200 to 500° C., more typically from 0 to 300° C. and the molecular weight and molecular distribution (polydispersity, the ratio of weight-average molecular weight to number-average molecular weight) of polymers prepared with present invention may typically be from about 100 to $10^6$ and from 1.001 to 100, respectively, and the glass transition temperature from −200 to 300° C., more typically from −200 to 200° C. Combinatorial chemistry and experimental design can be used in the present invention to explore and optimize the experimental conditions.

Scheme 1 shows an example of the formation of highly branched polyamide which incorporates a quaternizable nitrogen atom in the polymer backbone by reacting 3 molar equivalent tris(2-aminoethyl)-amine (A) with 1 molar eq. 1,4-cyclohexanedicarboxylic acid (B):

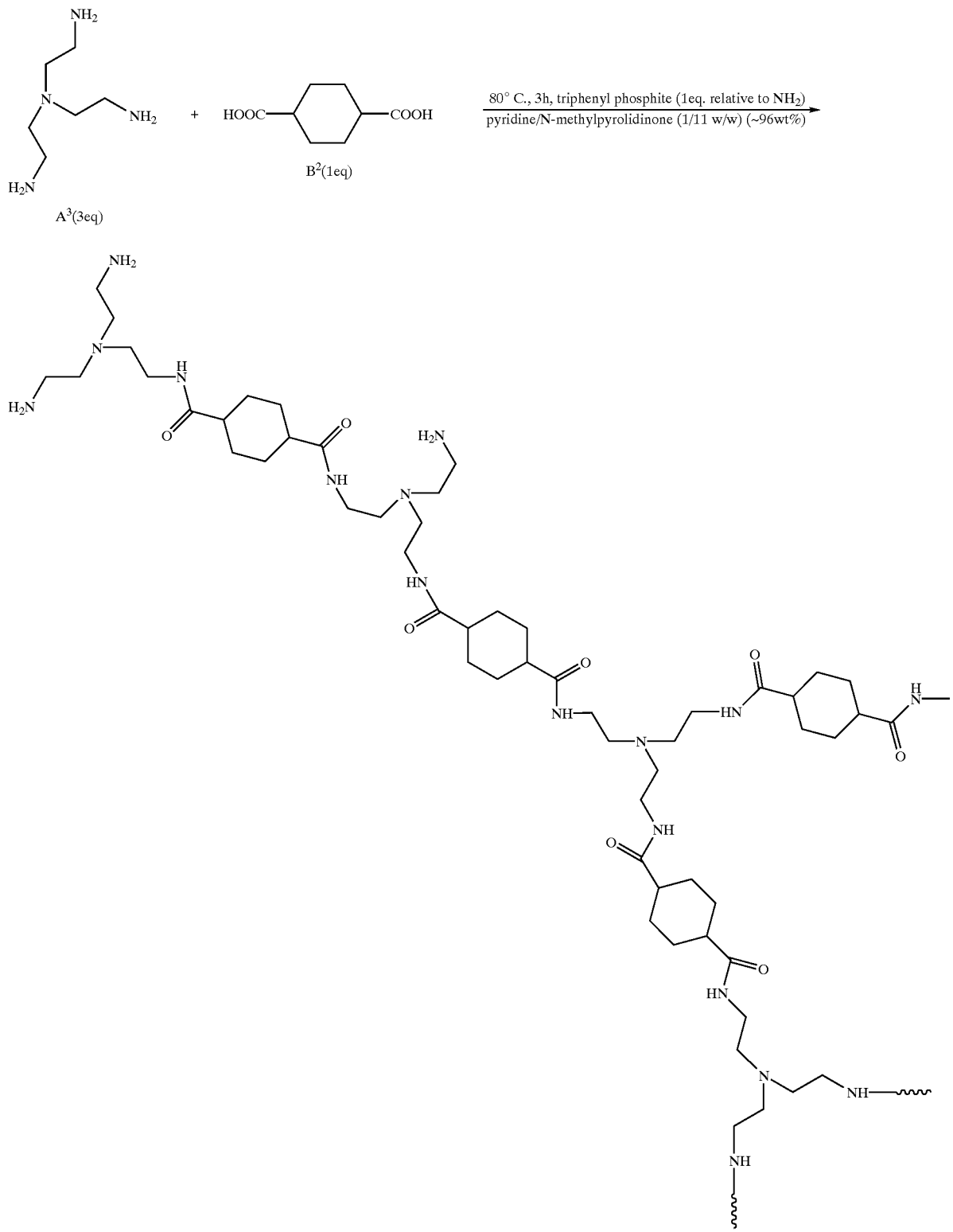

-continued

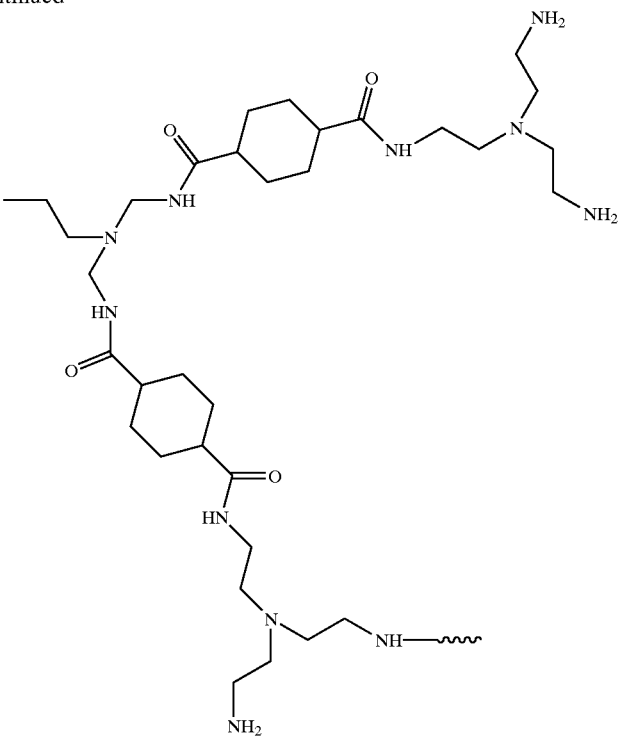

The polymerization process can be carried out with any amidation catalysts. Examples of these catalysts are: ammonium phosphate, triphenyl phosphite/pyridine, dicyclohexylcarbodiimide/1-hydroxybenzotriazole.

To prevent the formation of insoluble materials due to considerable crosslinking reactions in solution polymerization, the molar ratio of multifunctional monomers is important. In a preferred embodiment, when highly branched polyamides in accordance with the invention are obtained by solution polymerization, the molar ratio of reactive functional group of $NH_2$ to COOH or COOH to $NH_2$ is preferably from 2:1 to 100:1, more preferably 3:1 to 20:1. Insoluble materials refer to materials which are not soluble in any known solvents including water or their mixtures. Alternatively, condensation polymerization of multifunctional amine and multifunctional acid monomers may be performed in the presence of water at elevated temperatures and pressures as described in copending, concurrently filed, commonly assigned U.S. Ser. No. 09/919,097, the disclosure of which is incorporated by reference herein. As demonstrated in such copending application, polymerization of relatively high molecular weight highly branched polyamides which are still soluble (i.e., without gelation) can advantageously be obtained in a single polymerization step even when functional group ratios are close to 1 where the temperature employed during polymerization is from 100 to 350° C., more preferably 150 to 280° C., and the pressure varies from 140 kPa to $50 \times 10^3$ kPa, preferably from 600 to $7 \times 10^3$ kPa. The amount of water used may be, e.g., from 0.1 to 99.9 wt % in relation to total amount of solution, more preferably 0.5 to 50 wt %, most preferably 1 to 30 wt %.

In accordance with the present invention, hyperbranched polyamides are provided which are either water-soluble or water-dispersible. In preferred embodiments, water-dispersible hyperbranched polyamides formed have an average particle size less than 10,000 nm, preferably less than 200 nm, and most preferably less than 100 nm. In a particular embodiment, the present invention provides hyperbranched polymeric dyes with —C(O)NH— linkages which are either water-soluble or water-dispersible.

In still another preferred embodiment, multi-COOH terminated hyperbranched polyamide with N, P, As or S atom capable of forming an onium ion in its backbone itself may be capable of the formation of inter- or intra-molecular onium salt such as in Scheme 2. In still another preferred embodiment, multi-COOH or multi-$NH_2$ terminated hyperbranched polymers having N, P, As or S atoms capable of forming an onium ion in its backbone may be made soluble or dispersible in water simply by adjusting pH value of the solution or reaction with alkyl halide (Lewis acid) to form onium salt.

Scheme 2

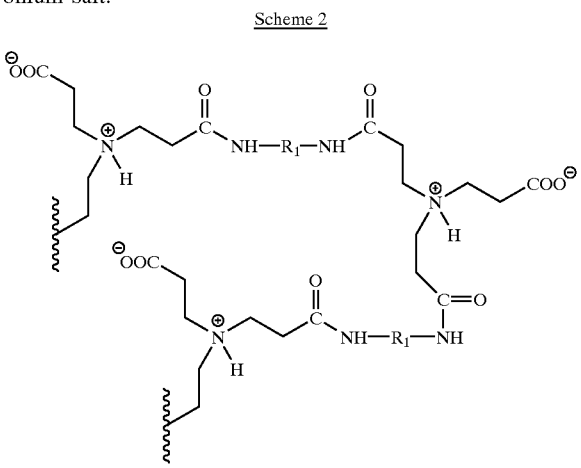

In another embodiment, the terminal amine or acid groups in polymers in accordance with the invention can be fully or partially converted to other types of functional groups by means of known organic reactions. Examples of these functional groups include but not limited to water soluble/dispersible groups, crosslinking groups such as vinyls, initiating and polymerizable groups for further chain extensions, imaging and photographically useful groups such as dyes and couplers, bio-compatible groups, and the like.

Scheme 3 illustrated some examples of transformation of $NH_2$ and COOH groups to other types of groups. Also, highly branched polymers with photographically useful end groups as described in U.S. Pat. No. 6,252,025, the disclosure of which is incorporated by reference, can be made via present invention. For example, a polymeric magenta coupler can be formed as in Scheme 4.

-continued

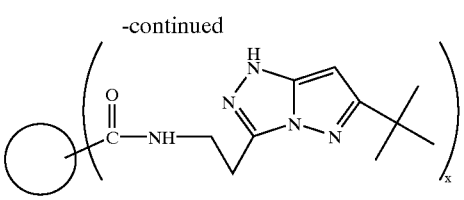

Similarly other types of functional polymers such as surface active polyamides, heat (temperature, pH, and the like)-sensitive smart polyamides, harvesting polyamides, and the like can be obtained.

Scheme 3

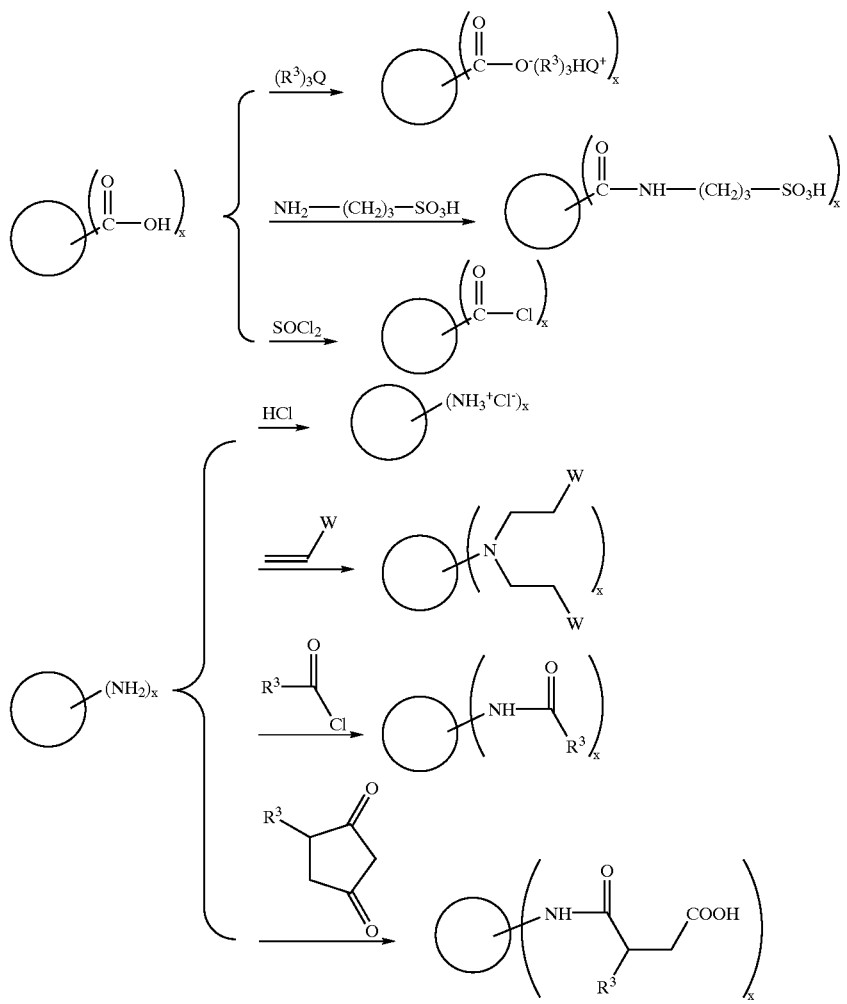

wherein Q is N, P, w is CN, $C(O)OR^3$.

Scheme 4

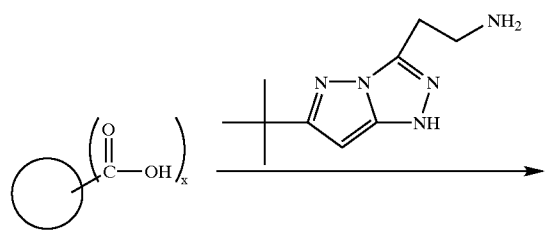

The functional hyperbranched polymers can also be used for further chain extension to form polymers with higher molecular weight and even more complex architectures. There are at least two ways to make chain extension.

First, one or more initiating sites can be introduced into the end of hyperbranched polyamide. These macroinitiators can be used in any kinds of living and non-living chain polymerizations such as radical, anionic, cationic, group transfer polymerization, atom transfer radical polymerization, telomerization, coordination polymerization, and the like to form polymer with more complex architectures such as star polymers with polyamide cores, hyperbranched polyamide based block/graft/super branched polymers and the like. Thus, the present invention provides a method to make even complex hybrid polymers or copolymers comprising polyamide sequence and vinylic sequence.

For example, a macro-initiator for Atom Transfer Radical Polymerization (ATRP) can be made by modification of $NH_2$ ended highly branched polymer with trichloroacetyl chloride (Scheme 5) and can be used in ATRP of methyl methacrylate with the formation of star or block copolymers (Scheme 6):

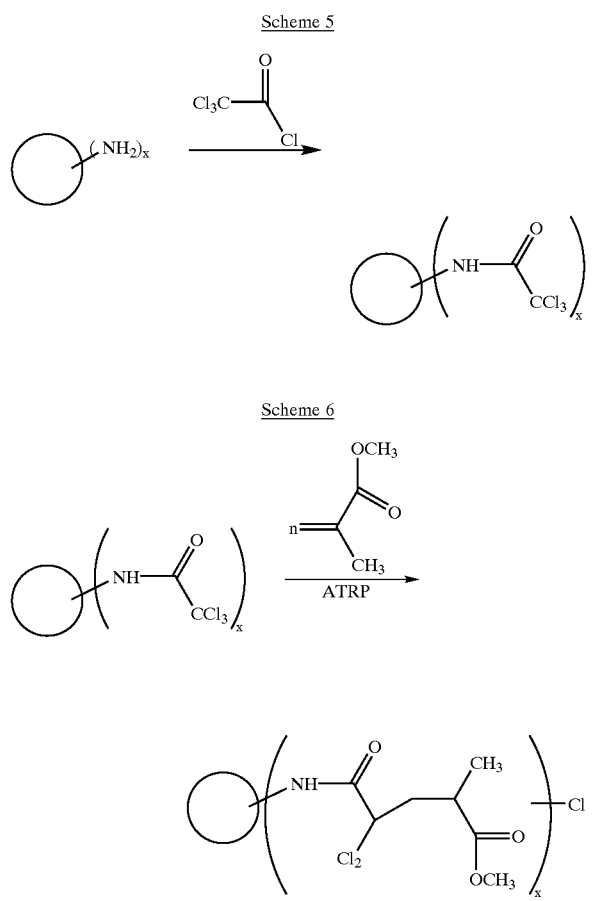

Alternatively, $NH_2$-ended hyperbranched polyamides can react with any mono- or multiple functional monomers such as epoxy, acid chloride, phenone, and anhydride containing condensation type of monomers to form even more complex polymers or copolymers.

For example, the reaction between multiple $NH_2$-ended hyperbranched polyamide and suitable amount of di-acid chloride yields soluble hyperbranched polyamide with higher molecular weight (Scheme 7).

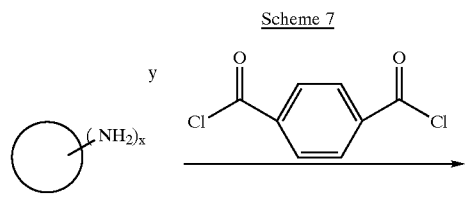

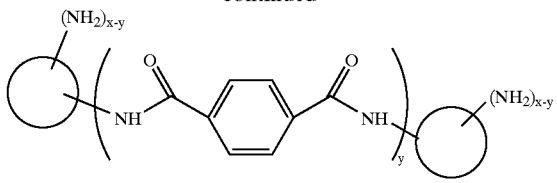

As another example, the reaction between multiple acid ended hyperbranched polyamide and mono-$NH_2$ containing Jeffamine may result in hydrophiphilic star copolymer with highly branched polyamide as the core and Jeffamine as the branches. In another embodiment, the functional groups in polymers prepared with present invention can be converted to other functional or special groups for various purposes.

The final polymers can be purified with known processes such as precipitation, extraction, and the like. Polymers can be used in the forms of solid particle, solution, dispersion, latex, and the like.

The polymers and copolymers prepared in the present invention can be used in a variety of applications such as plastics, elastomers, fibers, engineering resins, coatings, paints, adhesives, asphalt modifiers, detergents, diagnostic agents and supports, dispersants, emulsifiers, rheology modifiers, viscosity modifiers, in ink and imaging compositions, as leather and cements, lubricants, surfactant, as paper additives, as intermediates for chain extensions such as polyurethanes, as additives in inkjet, printing, optical storage, photography, photoresist, and coloration of polymer, as water treatment chemicals, cosmetics, hair products, personal care products, polymeric dyes, polymeric couplers, polymeric developers, antistatic agents, in food and beverage packaging, pharmaceuticals, carriers for drug and biological materials, slow release agent formulations, crosslinking agents, foams, deodorants, porosity control agents, complexing and chelating agents, carriers for chiral resolution agents, catalysts, carriers for gene transfection, for encapsulation, as light harvesting materials, as non-linear optical materials, to form super macromolecular assemble.

EXAMPLES

The invention can be better appreciated by reference to the following specific embodiments.

Example 1

Polymerization of tris(2-aminoethyl)amine (2 mol.eq) and Adipic Acid (1 mol. Eq.)

All reactants, tris(2-aminoethyl)amine (2 grams), adipic acid (1 gram), pyridine (7.1 ml), N-methylpyrolidinone (76 ml) and triphenyl phosphate (3.6 ml), were charged into a 250 ml three-neck round bottom flask along with a stir bar. The solution was stirred at 80° C. in a nitrogen atmosphere for three hours. The product was precipitated in 2000 ml of cold ether, collected via suction filtration and dried in the vacuum oven with 65% yield. The resulting highly branched polyamide polymer is soluble in water and methanol and insoluble in acetone and dimethylforamide.

Example 2

Polymerization of Nitrilotriacetic Acid (1 mol.eq) and 4,4'-oxydianiline (1 mol. eq.)

All reactants, nitrilotriacetic acid (1.9 grams), 4,4'-oxydianiline (2 grams), pyridine (9.34 grams), N-methylpyrolidinone (105 grams) and triphenyl phosphate (2.07 grams), were charged into a 250 ml three-neck round bottom flask along with a stir bar. The solution was stirred at 80° C. in a nitrogen atmosphere for three hours. The product was precipitated in 2000 ml of cold ether, collected via suction filtration and dried in the vacuum oven with 50% yield. The resulting highly branched polyamide polymer is dispersible in water.

Example 3

Polymerization of tris(2-aminoethyl)amine, Adipic Acid, and Dye Chromophore Tris(2-aminoethyl)amine (0.87 grams), adipic acid (0.15 gram), yellow dye chromophore (formula IV) (0.44 grams), pyridine (3.41 grams), N-methylpyrolidinone (38.36 grams) and triphenyl phosphate (1.9 grams), were charged into a 250 ml three-neck round bottom flask along with a stir bar. The solution was stirred at 80° C. in a nitrogen atmosphere for three hours. The product was precipitated in 2000 ml of cold ether, collected via suction filtration and dried in the vacuum oven with 50% yield. The resulting polyamide having dye chromophore incorporated into the polymer backbone is dispersible in water.

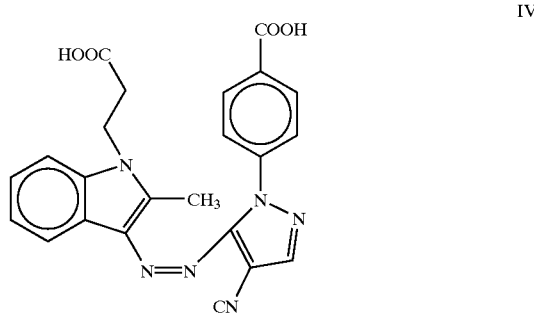

IV

Example 4

Polymerization of tris(2-aminoethyl)amine (3 mol.eq) and 1,4-cyclohexanedicarboxylic Acid (1 mol. Eq.)

All reactants, tris(2-aminoethyl)amine (44 grams), 1,4-cyclohexanedicarboxylic acid (17 gram), pyridine (35 grams), N-methylpyrolidinone (396 grams) and triphenyl phosphate (93 grams), were charged into a 1 L three-neck round bottom flask along with a stir bar. The solution was stirred at 80° C. in a nitrogen atmosphere for three hours. The product was precipitated in 2 L of cold ether, collected via suction filtration and dried in the vacuum oven with 30% yield. The resulting highly branched polyamide polymer has a Tg of 83° C., and is soluble in water and methanol and insoluble in acetone and dimethylforamide.

Example 5–8

Modification of Hyperbranched Polyamide

The modification of hyperbranched polyamide with a variety of anhydrides is listed in table 1 and the high efficiency (~100%) of the reaction between anhydrides and $NH_2$-termined polymer was confirmed by means of NMR spectroscopy. The typical example of modification of hyperbranched polyamide with anhydrides is described as follows for Example 5: To a 50 ml round bottom flask, 1 gram of hyperbranched polyamide as prepared in example 4 and 0.558 grams of phthalic anhydride were dissolved in 6.24 grams of DMSO. The solution was stirred at room temperature for 4 hrs. The polymer was obtained by precipitation from acetone. Examples 6–8 employing different anhydrides were prepared similarly as in Example 5.

TABLE 1

| | | Solubility[b] | | | | |
|---|---|---|---|---|---|---|
| | | Water | | Methanol | | DMF |
| Ex. | Anhydride/grams[a] | P | M | P | M | P | M |
| 5 | Phthalic anhydride/0.56 | S | S | S | S | NS | D |
| 6 | Succinic anhydride/0.37 | S | S | S | S | NS | NS |
| 7 | 2-dodecenyl-1-ylsuccinic anhydride/1 | S | S | S | S | NS | S |
| 8 | 2-octen-1-ylsuccinic anhydride/1 | S | S | S | S | NS | D |

[a]in all cases, 1 gram of polyamide as prepared in example 4 was used;
[b]P: parent polymer as prepared in example 4, M: modified polymer, S: soluble, NS: insoluble, D: dispersible.

Examples 9–10

Hyperbranching Polymerization of tris(2-aminoethyl)amine ($A_3$) and 1,4-cyclohexanedicarboxylic Acid ($B_2$) in Water A typical example of making hyperbranched polyamides from hyperbranching polymerization of tris(2-aminoethyl)amine ($A_3$) and 1,4-cyclohexanedicarboxylic acid ($B_2$) in water is described as follows:

Example 9: To a three-neck round flask equipped with a stirring bar and water condenser, 117 grams (0.6838 mol) of 1,4-cyclohexanedicarboxylic acid, 100 grams (0.6838 mol) of tris(2-aminoethyl)amine, and 440 ml of deionized water were added. The solution was heated at 60° C. for three hours. The salt solution obtained was concentrated to contain ca. 65 wt % solid (35 wt % water) and then added to a 1 liter stainless steel autoclave. Polymerization was carried out at 235° C. and ca. $3.3 \times 10^3$ kPa (416–480 psi) for 3 hours. The polymer was precipitated twice from cold acetone and dried at room temperature under vacuum for 24 hours.

Example 10: The general process of Example 9 was repeated, except for changing the molar ratio of reactants to obtain a different ratio of reactive $NH_2$ and COOH groups.

Table 2 summarizes the results for hyperbranching polymerization of tris(2-aminoethyl)amine ($A_3$) and 1,4-cyclohexanedicarboxylic acid ($B_2$).

TABLE 2

| | | | | | Solubility[d] | | |
|---|---|---|---|---|---|---|---|
| No | [A]/[B][a] | Yield[b] | Tg, ° C. | $M_{w,SEC}$[c] | Water | Methanol | Acetone |
| 1 | 3/2 | 72% | 130 | ~20 K | S | S | N |
| 2 | 3/1 | 30% | 65 | | S | S | N |

[a]molar ratio of reactive $NH_2$ and COOH groups;
[b]based on total amount of monomers used, insoluble materials <1% in all cases;
[c]weight-averaged molecular weight was measured by means of size exclusive chromatography;
[d]S: soluble; N: insoluble.

Example 11

Hyperbranching Polymerization of tris(2-aminoethyl)amine ($A_3$) and succinic anhydride ($B_2$) in Water 8.88 grams of tris(2-aminoethyl)amine ($A_3$) was charged into a round bottom flask containing 35 ml of ethanol and a stir bar. After cooling down the solution with a dry ice/acetone bath, a succinic anhydride THF solution (6.07 grams of monomer in 20 ml of THF) was slowly added over a 30 min period of time. The solution was then allowed to stir at room temperature for two hours and the solvents were removed by rotory evaporation. Polymerization of a monomer solution comprising the dry powder as prepared above and 7.7 ml of deionized water at 250° C. and under $2.8 \times 10^3$ kPa (410 psi) for 3.5 hours gave rise to hyperbranched polyamides with 85% yield. The polymer is soluble in water and methanol, but not in acetone.

The invention has been described in detail with particular reference to certain preferred embodiments thereof, but it will be understood that variations and modifications can be effected within the spirit and scope of the invention.

What is claimed is:

1. A highly branched polymer comprising a polyamide prepared in a single step procedure of condensation polymerization of ($a_1$) multi-functional di- or higher amine functional group containing monomers represented by the following formula (I) and multi-functional di- or higher carboxylic acid functional group containing monomers represented by the following formula (II), or a preformed salt of such di- or higher functional monomers, or ($a_2$) multi-functional branching monomers of the formula (III):

$$R^1(NH_2)_x \quad (I)$$

$$R^2(COOH)_y \quad (II)$$

$$A_n\text{—}L\text{—}B_m \quad (III)$$

where in formulas (I) and (II), $R^1$ and $R^2$ are each independently a monomeric, oligomeric, or polymeric compound nucleus, x and y are integers of at least 2, without x and y being 2 at the same time, and in formula (III), one of A and B represents an amine functional group, the other of A and B represents a carboxylic acid functional group, L represents a monomeric, oligomeric, or polymeric compound nucleus linking group between A and B, n is at least 1 and m at least 2;

wherein multiple monomer units of the highly branched polyamide are derived from monomers which contain a tertiary amine, phosphine, or arsenine group, such that the highly branched polyamide contains in the backbone thereof a quaternizable N, P or As atom.

2. A polymer according to claim 1, wherein multiple monomer units of the highly branched polyamide are derived from monomers which contain a tertiary amine group, such that the highly branched polyamide contains in the backbone thereof a quaternizable N atom.

3. A polymer according to claim 1, wherein multiple monomer units of the highly branched polyamide are derived from tri-functional monomers of formula (I), (II) or (III) where $R^1$, $R^2$, or L is of the formula $Q[(CH_2)_p]_3$ wherein p represents an integer of from 1 to 6, and Q represents a quaternizable N, P or As atom.

4. A polymer according to claim 3, wherein Q represents an N or P atom.

5. A polymer according to claim 3, wherein Q represents an N atom.

6. A polymer according to claim 3, wherein p represents an integer of from 1 to 3.

7. A polymer according to claim 3, wherein p represents 2.

8. A polymer according to claim 1, comprising a polyamide prepared in a single step procedure of condensation polymerization of multi-functional di- or higher amine functional group containing monomers of formula (I) and multi-functional di- or higher carboxylic acid functional group containing monomers of formula (II), wherein x and y are integers from 2 and 4, without x and y being 2 at the same time, or a preformed salt of such monomers.

9. A polymer according to claim 8, wherein one of x and y is 2 and the other of x and y is 3.

10. A polymer according to claim 9, wherein x is 2 and y is 3.

11. A polymer according to claim 9, wherein y is 2 and x is 3.

12. A polymer according to claim 8, wherein the multi-functional acid monomer comprises an anhydride group containing monomer.

13. A polymer according to claim 8, wherein multiple monomer units of the highly branched polyamide are derived from tri-functional monomers of formula (I) or (II) where $R^1$ or $R^2$ is of the formula $Q[(CH_2)_p]_3$ where p represents an integer of from 1 to 6, and Q represents a quaternizable N, P or As atom.

14. A polymer according to claim 13, wherein Q represents an N atom.

15. A polymer according to claim 14, wherein multiple monomer units of the highly branched polyamide are derived from tris(2-aminoethyl)amine monomer.

16. A polymer according to claim 14, wherein multiple monomer units of the highly branched polyamide are derived from nitrilotriacetic acid monomer.

17. A polymer according to claim 1, comprising a polyamide prepared in a single step procedure of condensation polymerization of multi-functional branching monomers of formula (III).

18. A polymer according to claim 17, wherein n is 1 and m is 2 or 3.

19. A polymer according to claim 17, wherein n is 1 and m is 2.

20. A polymer according to claim 19, wherein A represents an amino group and B represents a carboxylic acid group.

21. A polymer according to claim 19 wherein B represents an amino group and A represents a carboxylic acid group.

22. A polymer according to claim 17, wherein multiple monomer units of the highly branched polyamide are derived from tri-functional monomers of formula (III) where L is of the formula $Q[(CH_2)_p]_3$ where p represents an integer of from 1 to 6 and Q represents a quaternizable N, P, or As atom.

23. A polymer according to claim 22, wherein Q represents an N atom.

24. A polymer according to claim 1, wherein multiple monomer units of the highly branched polyamide are derived from multifunctional monomers of formula (I), (II) or (III) where $R^1$, $R^2$, or L comprises a dye chromophore to which functional amine or carboxylic groups are attached.

* * * * *